INVENTOR.
John T. Dewan

United States Patent Office 3,509,342
Patented Apr. 28, 1970

3,509,342
TWO DETECTOR PULSED NEUTRON LOGGING TOOL
John T. Dewan, Houston, Tex., assignor to Schlumberger Technology Corporation, Houston, Tex., a corporation of Texas
Filed Dec. 8, 1966, Ser. No. 600,170
Int. Cl. G01v 5/00; G01t 1/16
U.S. Cl. 250—83.1        14 Claims

ABSTRACT OF THE DISCLOSURE

One embodiment of the invention enables the observed neutron absorption characteristics of an earth formation to be corrected for neutron diffustion effects. Two neutron detectors space at different distances from a source of pulsed neutrons observe themal neutron decay times $\tau_1$ and $\tau_2$. These observed values of $\tau_1$ and $\tau_2$ are combined with a ratio of detector count rates R to produce a more accurate value of thermal neutron decay time, $\tau$; water saturation, $S_w$; and apparent thermal neutron decay time in the formation water, $\tau_{wa}$.

---

This invention relates to well logging methods and apparatus, and more particularly, to methods and apparatus for determining the water saturation in an earth formation surrounding a borehole through radiation techniques, and the like.

A low water saturation in a porous earth formation indicates an oil production horizon. As the percentage of water saturation within the formation increases, the probability of producing oil from the formation suffers a commensurate decline. Consequently, formation water saturation is an important oil production index and substantial efforts have been made to develop techniques that will measure this parameter with accuracy.

Boreholes that have been cased with one or more strings of steel pipe and cement annuli impose special problems in this regard. The steel and cement tend to degrade the quality of the measurement by introducing factors that essentially are unrelated to the formation characteristics. Moreover, the cost of plugging a cased borehole which is producing water and reperforating the casing to test for oil at a new level of the surrounding formation is so expensive that a failure to draw an economically significant volume of oil can produce a severe financial penalty. Thus, a decision to perforate a cased borehole that is based on unsatisfactory information can cause an expensive error. More disturbing, however, is the possibility that oil production zones may be overlooked when the formation under study is obscured by casing materials.

Various proposals have been advanced to measure formation water saturation from cased boreholes. One of these proposals has suggested a borehole tool that would irradiate the casing and the adjacent formation with bursts of neutrons. As the neutrons in each burst diffuse through the formation, they would lose their kinetic energy through collisions with the formation nuclei. Ultimately, most of these neutrons would be slowed down until their average kinetic energy was in equilibrium with the average kinetic energy of the formation molecules. When this condition occurs, these neutrons are considered thermal neutrons.

The macroscopic capture cross section, or neutron absorption probability, of casing and formation nuclei for these thermal neutrons is quite high. Thus, these thermal neutrons are absorbed by the nuclei and the thermal neutron population following each pulse decreases rapidly with the passage of time. By measuring the thermal neutron population during discrete intervals of time after each burst, the decay rate of the neutron population can be determined. This can be related to the apparent formation water saturation.

If the measurements are taken a sufficiently long period of time after each neutron burst, the effects of the borehole and casing on influencing the neutron decay rate are essentially negligible and the rate of decay of the neutron population then will typify the formation characteristics and not the borehole environment.

This proposal measures only the time variation of the thermal neutron population at a fixed point with respect to the neutron source, and imputes the decline largely to the absorption of thermal neutrons within the formation nuclei. The complete physical mechanims that influence the neutron population at any point, however, are more complicated. Specifically, this suggested technique fails to consider the decline in the neutron population that is caused by some of the thermal neutrons diffusing away from the region of interest during the measurement. This neutron diffusion effect can introduce an error in the foregoing proposed formation water saturation measurement. Accordingly, there is a need for a more precise technique for measuring water saturation that accounts for the effect of diffusion as well as thermal neutron absorption.

Therefore, it is an object of the invention to more precisely measure formation water saturation.

It is another object of the invention to measure the spatial as well as the temporal distribution of the neutrons in an earth formation.

It is still another object of the invention to determine the formation water saturation through a combination of the formation porosity and the time required for the thermal neutrons to decay a relative amount.

It is a further object of the invention to use two neutron detectors to measure the diffusion and absorption of the neutrons emitted from a pulsed source.

In accordance with one embodiment of the invention, two detectors measure the diffusion and absorption characteristics of a formation irradiated by successive pulses of neutrons. One of these detectors measures the neutron absorption characteristics of the formation. The other detector is spaced from the first detector and measures the spatial distribution of the neutrons as indicated through a somewhat different observed neutron absorption characteristic for the same formation. By contrasting these two absorption characteristics, a correction is developed that accounts for neutron diffusion effects which enables a more precise formation water saturation to be computed.

More particularly, in one embodiment of the invention a source irradiates the formation surrounding a borehole with successive pulses of neutrons. A portion of the irradiating neutrons are thermalized and absorbed by the formation nuclei, whereupon some of these nuclei emit "capture" gamma rays. A first gamma ray detector is spaced from the neutron source and detects some of these captured gamma rays to provide an indication of the thermal neutron population in the nearby formation at the time of observation.

As disclosed in more complete detail in U.S. patent application Ser. No. 592,795, filed on Nov. 8, 1966 by William B. Nelligan for "Method and Apparatus for Measuring Neutron Characteristics of a Material" and assigned to the same assignee as the invention described herein, the first gamma ray detector is interrogated, or "gated," during two intervals of time between each successive burst of neutrons. These intervals, moreover, are so related that the second gate is twice as long as the first. The lengths of these interrogation intervals are adjusted automatically until the counting rate during the first interval is 1.99 times the counting rate detected during the longer second interval. When this condition has been attained, the interval established for the first gate is equal to the thermal neutron decay time, which is defined as the time required for the thermal neutron population to decrease by a factor of $1/e$, where $e$ is the natural logarithm base. The thermal decay time, moreover, is related to the apparent water saturation of a formation and can be expressed in these terms.

In accordance with the invention, however, a more precise value of formation water saturation can be obtained by spacing a second detector from the neutron source a distance greater than the first detector. This second detector may be gated separately in a manner similar to the first detector.

A thermal neutron decay time is established through the operation of the second detector, which necessarily must be different from the decay time indicated by the first detector. This difference exists because the rate at which neutrons diffuse away from (or towards) a given region depends on the gradient of the population in the region, which in turn is a function of the spacing of the detector from the source. The decay time difference characterizes the neutron spreading that occurs within the formation during the time between the irradiating burst and the end of the interrogation periods for the two detectors. Consequently, the influence of neutron diffusion that is indicated by this difference, along with the ratio of the detector count rates, provides the basis for a correction which enables a more accurate thermal neutron decay time to be computed. This corrected decay time can be expressed in terms of apparent formation water saturation to permit the oil-bearing potential of the formation to be evaluated more readily.

The adverse influence of borehole casing materials is overcome by interrogating the detectors not earlier than two decay times after the end of each neutron pulse. This interval enables the more rapidly decaying gamma ray flux from the borehole and casing materials to subside and not interfere with the observation of the more slowly decaying flux of gamma rays emanating from the formation beyond the casing.

For a better understanding of the present invention, together with other and further objects thereof, reference is had to the following description taken in connection with the accompanying drawings, the scope of the invention being pointed out in the appended claims.

Referring to the drawings.

In order to appreciate more fully the principles and advantages of the present invention, it is important to distinguish the physical phenomena measured in accordance with the invention from the analytical terms that frequently are used to describe these phenomena. The invention measures the neutron absorption and diffusion characteristics of the earth formations surrounding a borehole, and corrects the measured absorption for neutron loss as a consequence of leakage from the region being investigated. Illustratively, the general equation describing the neutron balance within a formation is $$Production - absorption - leakage = \frac{\partial n}{\partial t} \quad (1)$$

where $n$ is the neutron density, and $\partial n/\partial t$ is the rate of change in the neutron density with time.

Neutron absorption in formation materials frequently is described in terms of $\tau$, the thermal neutron decay time, or $\Sigma_{th}$, which is the macroscopic thermal neutron absorption cross section, or probability of a formation to absorb thermal neutrons. Accordingly, the phenomenon of neutron production, absorption and leakage characterizing Equation 1 can be described in terms of $\tau$, $\Sigma_{th}$, or other suitable parameters. Thus, the invention is directed to apparatus and methods for compensating a measured neutron absorption for the effect of neutron leakage. The subsequent analysis is merely illustrative of these principles and does not limit the invention to the manipulation of specific mathematical terms.

Figure 1:
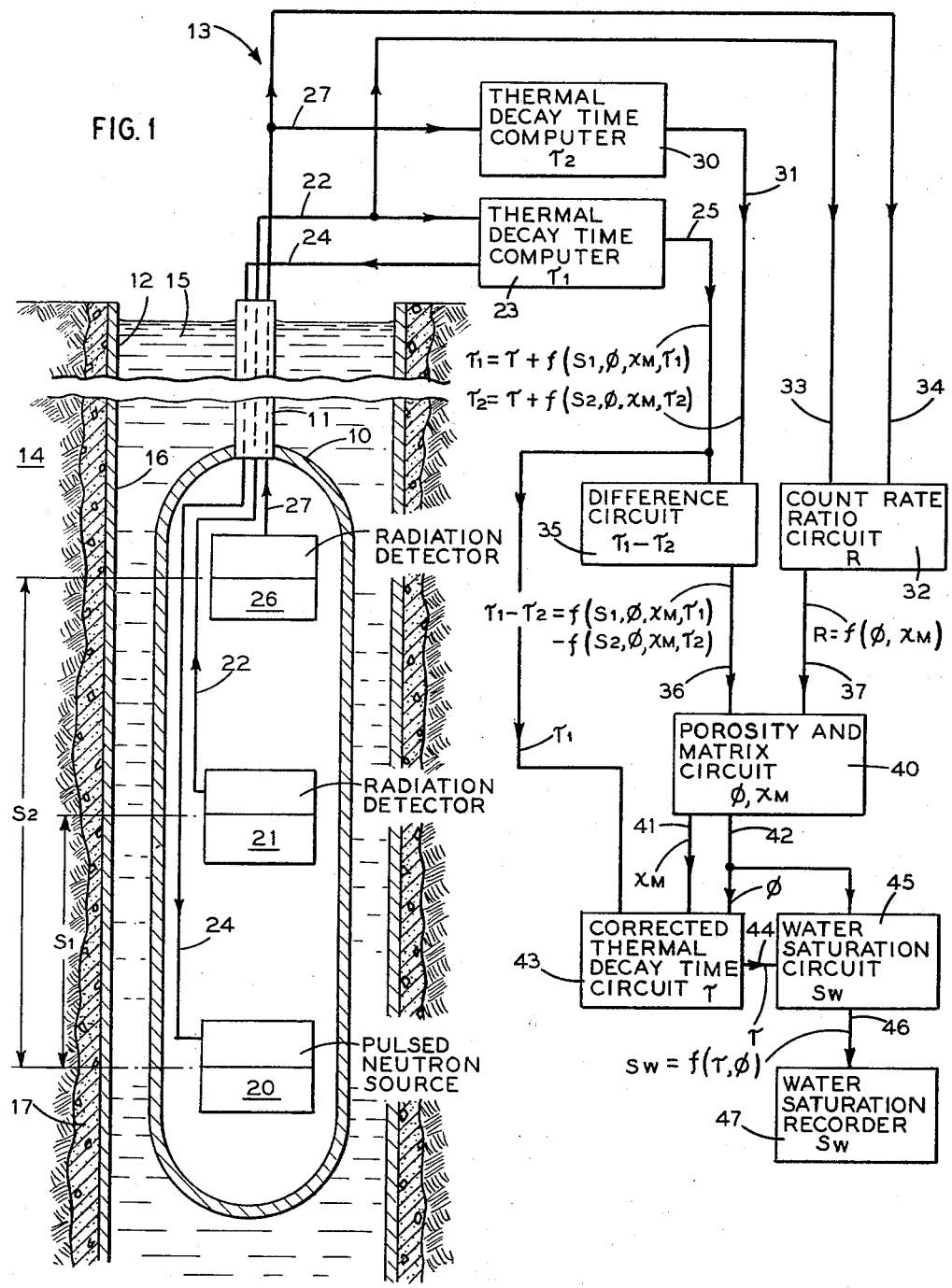
FIG. 1 is a schematic diagram of an exemplary tool embodying the principles of the invention and showing the electrical circuits in block diagram form.

One embodiment of a practical apparatus for identifying formation porosity in accordance with these principles is shown in FIG. 1 of the drawing.

A fluid-tight pressure resistant housing 10 is suspended by an armored cable 11 in a borehole 12. As will be described later in detail, cable 11 may comprise a group of insulated conductors that electrically connect the equipment within the housing 10 with a computer circuit 13 at the earth's surface. A winch (not shown) is located at the surface and is used to lower and raise the housing 10 in the borehole 12 in the customary manner to traverse earth formations 14.

The borehole 12 may be dry, or may be filled with a water-base or oil-base drilling mud 15, as shown. Borehole 12 may be uncased, or it may be lined with one or more strings of steel casing 16 and annuli of concrete 17, also as shown.

Supported in the lowermost end of the housing 10 is a pulsed neutron source 20 for irradiating the earth formation 14 with successive pulses of neutrons. The pulsed neutron source 20 shown in the exemplary embodiment may be of the type described in U.S. Patent No. 2,914,677 granted to Wayne R. Arnold on Nov. 24, 1959 for "Well Logging Apparatus" and assigned to the assignee of the invention herein described. The rate at which the neutrons in each of the bursts are absorbed by the formation 14 is a function, to a large extent, of the formation's neutron absorption probability. This probability may be described, as hereinbefore mentioned, in terms of the macroscopic capture cross section $\Sigma_{th}$, or thermal neutral decay time $\tau$.

To detect changes in the neturon population in each of these pulses, the effective center of a radiation detector 21 is spaced axially a distance $S_1$ from the effective center of the pulsed neutron source 20.

The radiation detector 21 may be a gas-filled tube for detecting neutrons diffusing back to the detector 21 from the formation 14. Charge pulses produced by nuclear reactions between these neturons and the filling gas provides a measure of the neutron flux under observation.

As shown in FIG. 1, however, the detector 21 comprises a scintillator crystal which responds to capture gamma rays emitted from the formation 14 by producing a flash of light. The photons from the flash of light are transmitted through the crystal to a photomultiplier tube which is coupled optically to a surface of the crystal. The photons impinge on a photocathode within the tube and free electrons from the cathode surface. These electrons are accelerated to dynodes where their impact frees more electrons to produce amplified charge pulses at the tube anode. A signal characterizing these charge pulses or "counts" is sent to the earth's surface through conductor 22 in the armored cable 11.

The signal is registered in a thermal neutron decay time computer 23 on the earth's surface. One suitable computer is disclosed more fully in the aforementioned Nelligan patent application. Accordingly, the computer 23 interrogate the detector 21 during two intervals of time between each neutron burst. The computer adjusts the length of the interrogation intervals until the first interval is half the length of the second, and the ratio of counts in the first interval is 1.99 time the second. When this condition has been established, the first interval is equal to the observed thermal neutron decay time $\tau_1$. Computer 23 sends a signal throughoutput conductor 25 that corresponds to the observed thermal neutron decay time $\tau_1$ for the formation 14.

The computer 23 also controls the operation of the pulsed neutron source 20 by transmitting a signal to the housing 10 through conductor 24 in the cable 11 that enables the source to emit precisely timed pulses of neutrons. A further signal from the computer 23 through the conductor 24 suppresses ever fourth pulse to permit the detector 21 to measure the background radiation from the formation 14 and thereby compute a more exact value of $\tau_1$.

In a similar manner, the effective center of radiation detector 26 is spaced axially a distance $S_2$ from the effective center of the neutron source 20. Distance $S_2$ is greater than distance $S_1$ to enable the detectors 26 and 21 to measure the neutron leakage characterizing the formation in the region $S_2-S_1$. Thus, detector 26 transmits a signal through conductor 27 in the armored cable 11 to a thermal neutron decay time computer 30 on the earth's surface. The computer 30 sends a signal through conductor 31 that corresponds to the observed thermal neutron decay time $\tau_2$, which differs from $\tau_1$, as hereinbefore described.

In accordance with the invention, more correct values of thermal neutron decay time $\tau$, and water saturation $S_w$, are computed by combining the signals from the detectors 21 and 26. Toward this end, the ratio R of the counting rates observed by the detectors 21 and 26 is computed in count rate ratio circuit 32. The input signal for the circuit 32 is obtained from conductors 33 and 34 which are connected in parallel with the conductors 22 and 27, respectively.

Figure 3:
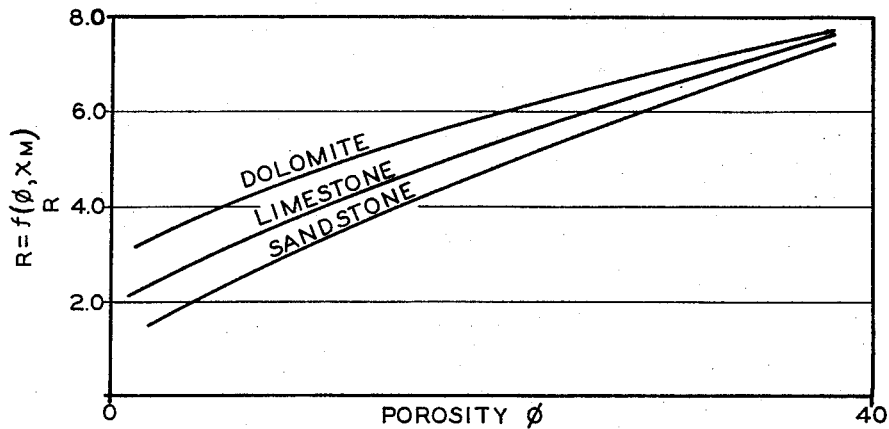
FIG. 3 is a representative graph of the ratio of detector counting rates as a function of the porosity of different earth formations.

It has been determined that $$R = f(\phi, \chi_m) \tag{2}$$

where $\phi$ is the formation porosity, and $\chi_m$ is a parameter characterizing the specific formation matrix under consideration. As shown in FIG. 3, graphs of the ratio R as a function of porosity $\phi$ for sandstone, limestone and dolomite, are approximately linear and have different slopes that establish a separation between the curves. The slopes and intercepts of these curves involve the parameter $\chi_m$. Consequently, a specific equation expressing R as a function of $\phi$ and $\chi_m$ can be developed for each formation through curve-fitting techniques.

The observed thermal neutron decay times $\tau_1$ and $\tau_2$ are related to the true formation thermal neutron decay time in accordance with the following equations:

$$\tau_1 = \tau + f(S_1, \phi, \chi_m, \tau_1) \tag{3}$$

$$\tau_2 = \tau + f(S_2, \phi, \chi_m, \tau_2) \tag{4}$$

Figure 2:
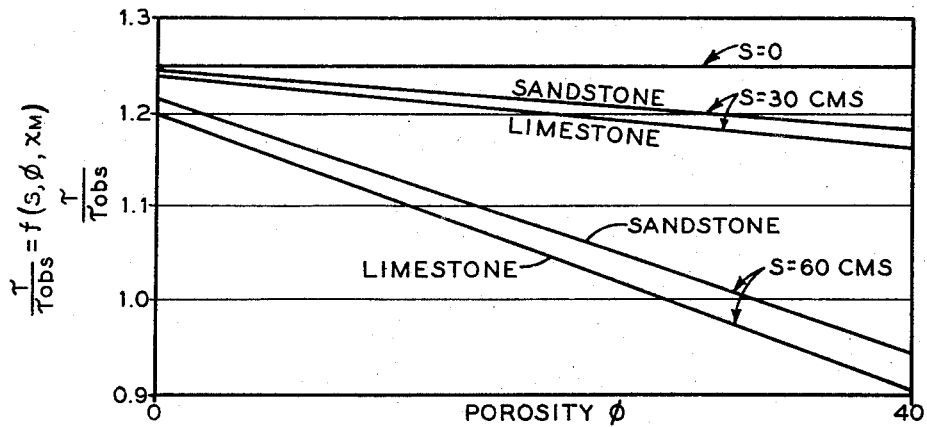
FIG. 2 is a representative graph of the ratio of true thermal neutron decay time to observed thermal neutron decay time as a function of the porosity of different earth formations and different detector spacings.

Equations 3 and 4 may be verified through an examination of the graphs (FIG. 2) of $\tau/\tau_{obs}$ as a function of formation porosity, $\phi$, for different source-detector separations, S, where $\tau_{obs}$ is the observed decay time registered either detector 21 or detector 26, which has not been corrected for diffusion effects. Through curve fitting with the data shown in FIG. 2, an equation relating $\tau_{obs}$ to $\tau$ and $\phi$ can be developed for each value of S for a specific formation, such as sandstone or limestone. Thus, for each formation and tool configuration, the precise nature of the expressions $f(S_1,\phi,\chi_m,\tau_1)$ and $f(S_2,\phi,\chi_m,\tau_2)$ in Equations 3 and 4 can be determined and substituted.

Equations 2, 3 and 4 constitute three equations that relate the three unknown terms $\tau$, $\phi$ and $\chi_m$ to each other. To solve for these unknown values, $\tau$ is first eliminated by subtracting Equation 4 from Equation 3:

$$\tau_1 - \tau_2 = f(S_1,\phi,\chi_m,\tau_1) - f(S_2,\phi,\chi_m,\tau_2) \tag{5}$$

Because the neutron source-detector separation distances $S_1$ and $S_2$ and the observed thermal neutron decay times $\tau_1$ and $\tau_2$ are known, Equation 5 can be combined with Equation 2 in order to solve for the two unknown values $\phi$ and $\chi_m$.

Substituting values and rearranging Equation 3 in the form:

$$\tau = \tau_1 - f(S_1,\phi,\chi_m,\tau_1) \tag{6}$$

produces a solution for the true formation thermal neutron decay time $\tau$.

In operation, signals corresponding to the observed thermal neutron decay times, $\tau_1$ and $\tau_2$, on conductors 25 and 31, respectively, are applied to a difference circuit 35 which performs either an analog or digital subtraction according to Equation 5, depending upon the character of the input signals to the conductors 25 and 31.

The computing circuits herein described preferably may take the form of operational amplifiers having resistor-diode type function former networks connected into the feedback circuits thereof. The amplifier gain adjustment provided by these feedback resistances enables the amplifiers to combine the signals supplied to the circuit inputs according to the specific equation to be solved, in order to produce an amplifier output signal that corresponds to the solution of the equation.

The signal that corresponds to the difference between the observed thermal neutron decay times is applied to conductor 36. This difference signal is combined in porosity and matrix circuit 40 with the counting rate ratio signal R on conductor 37. The porosity and matrix circuit 40 combines the input signals R and $\tau_1-\tau_2$ and solves for the parameters $\phi$ and $\chi_m$. Output signals corresponding to $\chi_m$ and $\phi$ are sent through conductors 41 and 42, respectively, to corrected thermal neutron decay time circuit 43. Circuit 43 combines the known values of $S_1$, $\phi$, $\chi_m$ and $\tau_1$ and solves Equation 6 for the corrected value of the thermal neutron decay time, $\tau$. A signal that corresponds to $\tau$ is applied to an output conductor 44 by the correction circuit 43.

The foregoing is a general analysis of the invention in terms of thermal neutron decay time, which is illustrative of one embodiment of the invention. As hereinbefore mentioned, other parameters, such as thermal neutron macroscopic absorption cross sections, also can be manipulated to provide an accurate indication of oil in the formation 14 by accounting for neutron population decay through both absorption and diffusion phenomena.

Formation water saturation $S_w$ is computed from $\phi$ and $\tau$ to present the neutron absorption and diffusion information in a form that can be interpreted more readily in terms of the presence or absence of oil. Accordingly, water saturation circuit 45 combines $\tau$ and $\phi$ as follows:

$$\frac{1}{\tau} = \frac{(1-\phi)}{\tau_m} + \frac{\phi S_w}{\tau_w} + \frac{\phi(1-S_w)}{\tau_o} \tag{7}$$

where $\tau_w$ is the thermal neutron decay time in the formation water, a known value, inasmuch as water samples can be obtained during drilling through formation fluid sampler tools; and $\tau_o$ is the thermal neutron decay time in oil, a value known from laboratory experiments and the published literature. Equation 7 may be reduced for ease of computation to:

$$S_w = \frac{\tau_w \tau_o}{\tau_o - \tau_w}\left[\frac{1}{\phi}\left(\frac{1}{\tau}-\frac{1}{\tau_m}\right)+\left(\frac{1}{\tau_m}-\frac{1}{\tau_o}\right)\right] \tag{8}$$

$$= k_1\left[\frac{1}{\phi}\left(\frac{1}{\tau}-\frac{1}{\tau_m}\right)k_2\right] \tag{9}$$

where $k_1$ and $k_2$ are constant for a given lithology and connate water salinity, i.e., $$k_1 = \frac{\tau_w \tau_o}{\tau_o - \tau_w} \tag{10}$$

$$k_2 = \frac{1}{\tau_m} - \frac{1}{\tau_o} \tag{11}$$

Water saturation circuit 45 solves Equation 9 and sends a signal that corresponds to $S_w$ from the circuit 45 through conductor 46 to water saturation recorder 47. Illustratively, the recorder 47 may be a recording galvanometer that produces a graph of $S_w$ as a function of borehole depth.

If the salinity of the formation water is not known, circuit 45 preferably may compute $\tau_{wa}$, the apparent thermal neutron decay time in the formation water through the equation:

$$\tau_{wa} = \frac{\phi \tau \tau_m}{\tau_m + (\phi - 1)\tau} \quad (12)$$

where $\tau_m$ is the thermal neutron decay time in the formation matrix, a value that can be determined through laboratory experiment or the published literature if the actual formation minerals are known from some other source, such as examination of drill cuttings. A record of $\tau_{wa}$ as a function of borehole depth would produce a relatively flat curve with peaks at the oil-producing zones. These peaks enable profitable horizons to be identified through drilling fluid and casing material.

In the embodiment of the invention shown in FIG. 1, channels 22 and 27 transmit signals from the detectors 21 and 26, respectively, to the appropriate thermal decay time computers 23 and 30. A single transmission channel could accomplish the same function if the detectors 21 and 26 are interrogated on alternate neturon bursts. Moreover, the far detector 26 could be interrogated after each of several neutron bursts for every one interrogation of the near detector 21, in order to equalize the counting statistics. Switching circuitry can steer the two sets of detector signals on the single channel to the appropriate decay time computer on the surface of the earth.

By interrogating the detectors 21 and 26 at the decay time computers 23 and 30, the total counts registered by the detectors durinng the entire irradiation period are trannsmitted through conductors 22 and 27. Consequently, all of the detector counts are available to the parallel conductors 33 and 34 and may be used to compute the ratio R. This larger volume of detector counts enhances the statistical validity of the ratio computation.

While particular embodiments of the present invention have been shown and described, it is apparent that changes and modifications may be made without departing from this invention in its broader aspects, and therefore, the aim in the appended claims is to cover all such changes and modifications as fall within the true spirit and scope of this invention.

What is claimed is:

1. A system for measuring the absorption of neutrons within an earth formation comprising a source of neutrons for irradiating the earth formation, a first detector for observing the absorption of said irradiating neutrons within the formation, said first detector being selectively interrogated at intervals and for durations that are determined by the neutron absorption probabilities within said formation, a second detector spaced from said first detector for measuring the diffusion of said irradiating neutrons within the earth formation, and circuit means for correcting said observed neutron absorption in accordance with said measured neutron diffusion.

2. A system according to claim 1 wherein said source of neutrons comprises control means for activating said source intermittently to irradiate the earth formation with pulses of neutrons.

3. A system according to claim 1 wherein said second detector comprises a control circuit for measuring the neutron absorption within the formation and selectively interrogating said second detector at intervals of durations that are determined by said neutron diffusion properties of the earth formation.

4. Apparatus for measuring a more precise thermal neutron decay time of a neutron population irradiating an earth formation comprising a source for irradiating the earth formation with pulses of neutrons, a first detector responsive to neutrons thermalized within the earth formation for observing the decay time of the thermal neutrons irradiating the formation, comptuer means for interrogating said first detector twice after at least one of said neutron pulses for periods proportional to said observed decay time, a second detector responsive to neutrons thermalized within the formation for observing the diffusion of said neutrons within the earth formation, further computer means for interrogating said second detector twice after at least one of said neutron pulses for periods proportional to the decay time of the thermal neutrons irradiating the formation observed by said second detector, and circuit means for correcting said observed decay times in accordance with said neutron diffusion to indicate a more precisely measured decay time of the thermal neutrons within the earth formation.

5. Apparatus according to claim 4 wherein said correcting circuit means comprises means for combining said observed decay times to produce signals corresponding to the difference therebetween, and further circuit means for combining said difference signals with at least one of said observed decay times to produce the more precise thermal neutron decay time.

6. Equipment for computing a corrected thermal neutron decay time for an earth formation irradiated with successive pulses of neutrons, comprising a source of irradiating neutrons, a first radiation detector responsive to neutrons thermalized within the formation, computer means associated with said first detector for calculating the thermal neutron decay time in accordance with said first detector response, a second radiation detector spaced from said first detector and responsive to neutrons thermalized within the formation, computer means associated with said second detector for calculating the thermal neutron decay time in accordance with said second detector response, circuit means for calculating the ratio of said detector responses, difference circuit means for subtracting said calculated thermal neutron decay times and combining said difference with said ratio of detector responses to provide at least one signal to compensate for the diffusion of the irradiating neutrons within the earth formation, and further circuit means for applying said difference circuit compensating signal to at least one of said calculated thermal neutron decay times to produce the corrected decay time for the irradiated earth formation.

7. Equipment according to claim 6 comprising a water saturation circuit for combining said corrected thermal neutron decay time with at least a part of said difference circuit compensating signal to produce a signal that corresponds to the water saturation of the earth formation.

8. Equipment according to claim 7 comprising recorder means for displaying said water saturation signal.

9. A computer for calculating the time required for a pulse of irradiating neutrons in an earth formation to decay, comprising signal means for producing a first signal that corresponds to the neutrons thermalized within the formation at one position within the earth formation, further signal means for producing a second signal that corresponds to the neutrons thermalized within the formation at another position within the formation, a decay time circuit for calculating a measured neutron decay time in response to said first signal, a further decay time circuit for calculating another measured neutron decay time in response to said second signal, a subtraction circuit to calculate the difference between said measured neutron decay times, a ratio circuit for calculating the quotient of said first and second signals, circuit means for combining said decay time difference and said first and second signal quotient to provide a correction signal, and correction circuit means for applying said correction signal to at least one of said measured neutron decay times to compute a more precise neutron decay time.

10. A computer according to claim 9, comprising water saturation circuit means responsive to said more precise neutron decay time and at least a portion of said correction signal to indicate the earth formation water saturation.

11. A computer according to claim 10, comprising recorder means for displaying said earth formation water saturation indication.

12. A method for accurately measuring the absorption of neutrons within an earth formation, comprising irradiating the earth formation with pulses of neutrons, measuring the neutrons thermalized within the formation from at least one of the neutron pulses at one position within the formation during a period of time that is proportional to the observed neutron absorption at said one position, measuring neutrons thermalized within the formation from at least some of the neutron pulses at another position within the formation during a period of time that is proportional to the observed neutron absorption at said another position, comparing said time measurements, and correcting at least one of said time measurements in accordance with said time measurement comparison to produce a more accurate indication of the neutron absorption within the earth formation.

13. A method according to claim 12, comprising combining neutron absorption measurement with at least a part of said neutron time measurement comparison to compute the water saturation of the earth formation.

14. A tool for measuring earth formation characteristics comprising a source of neutrons for irradiating the earth formation, a detector responsive to neutrons thermalized within the formation in accordance with characteristics of the earth formation to measure the apparent neutron absorption characteristic thereof, another detector spaced from said neutron responsive detector for measuring the spatial distribution of said neutrons thermalized within the earth formation to determine more precisely said apparent neutron absorption characteristic, and means for interrogating said spatial detector in accordance with the apparent neutron absorption characteristic of the earth formation observed by said spatial detector.

References Cited

UNITED STATES PATENTS 3,373,280   3/1968   Mills.

ARCHIE R. BORCHELT, Primary Examiner

U.S. Cl. X.R.

250—83.3, 83.6